(12) United States Patent
Ueno

(10) Patent No.: US 7,304,653 B2
(45) Date of Patent: Dec. 4, 2007

(54) DISPLAY APPARATUS AND METHOD FOR ALTERING DISPLAY ELEMENTS BASED ON VIEWPOINT

(75) Inventor: Kiyoko Ueno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 71 days.

(21) Appl. No.: 10/914,270

(22) Filed: Aug. 10, 2004

(65) Prior Publication Data

US 2005/0052413 A1  Mar. 10, 2005

(30) Foreign Application Priority Data

Sep. 4, 2003  (JP)  ............................. 2003-312951

(51) Int. Cl.
G09G 5/00  (2006.01)
(52) U.S. Cl. .................. 345/649; 345/659; 701/208
(58) Field of Classification Search ................ 345/158, 345/649, 659; 701/208
See application file for complete search history.

(56) References Cited

U.S. PATENT DOCUMENTS

| | | | | |
|---|---|---|---|---|
| 4,527,155 A | * | 7/1985 | Yamaki et al. | ............... 345/657 |
| 4,914,605 A | * | 4/1990 | Loughmiller et al. | ........ 345/649 |
| 5,297,051 A | * | 3/1994 | Arakawa et al. | ............. 701/200 |
| 5,559,938 A | * | 9/1996 | Van Roekel et al. | ......... 345/441 |
| 6,539,289 B2 | * | 3/2003 | Ogino et al. | .................... 701/1 |
| 6,950,100 B2 | * | 9/2005 | Yamada et al. | .............. 345/428 |
| 2001/0039474 A1 | | 11/2001 | Hayashi et al. | |
| 2002/0140667 A1 | * | 10/2002 | Horiki | ......................... 345/156 |

FOREIGN PATENT DOCUMENTS

| | | |
|---|---|---|
| EP | 0 747 863 B1 | 12/1996 |
| JP | 2001-222271 A | 8/2001 |
| JP | 2003-121160 A | 4/2003 |

OTHER PUBLICATIONS

M. Borges et al, CorelDRAW 7, Das Kompendium, Market & Technik, 1998, ISBN 3-8272-5477-9, pp. 450-452, 465-470, HB.

* cited by examiner

Primary Examiner—Kee M. Tung
Assistant Examiner—Michelle K Lay
(74) Attorney, Agent, or Firm—Sughrue Mion Pllc.

(57) ABSTRACT

A display apparatus is constructed of a display device for displaying a character and a map display processing part that receives a setting from which side the display device is viewed, and rotates a character to be displayed on the screen of display device if the inclination of the character with respect to a horizontal line is out of a predetermined range of angle that is decided according to said set side.

1 Claim, 9 Drawing Sheets

FIG.3
(A) IN A CASE WHERE ROAD LINK HAS AN ANGLE OF 0°
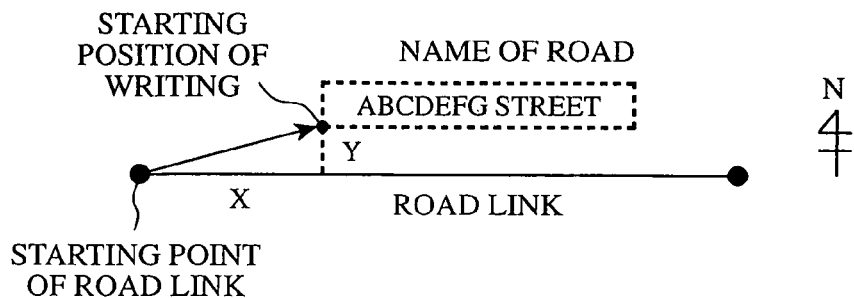
(B) IN A CASE WHERE ROAD LINK HAS AN ANGLE OF $\theta$°
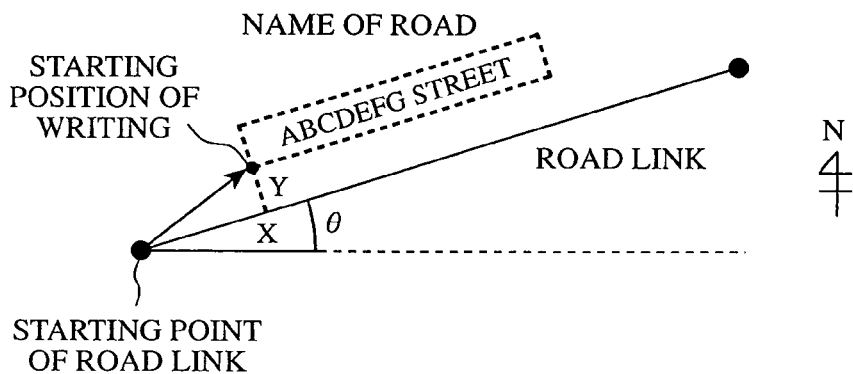
FIG.4
(A)
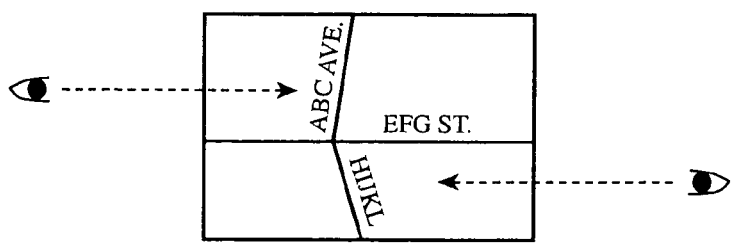
(B)
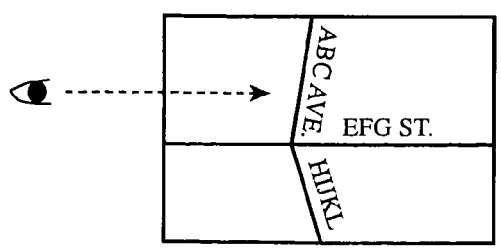
(C)
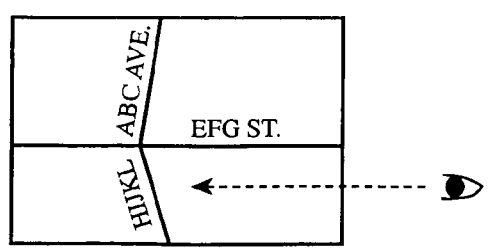

FIG.5
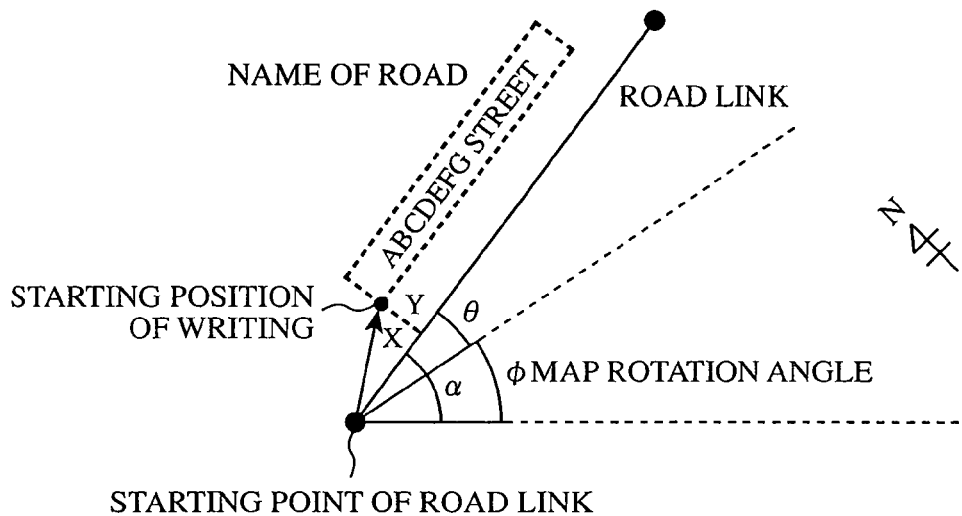
FIG.7
(A)
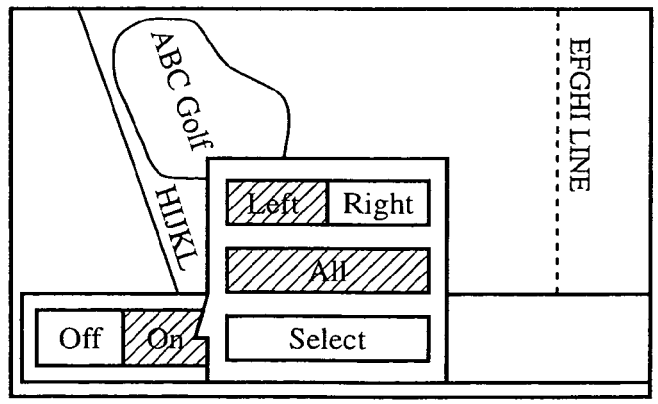
(B)
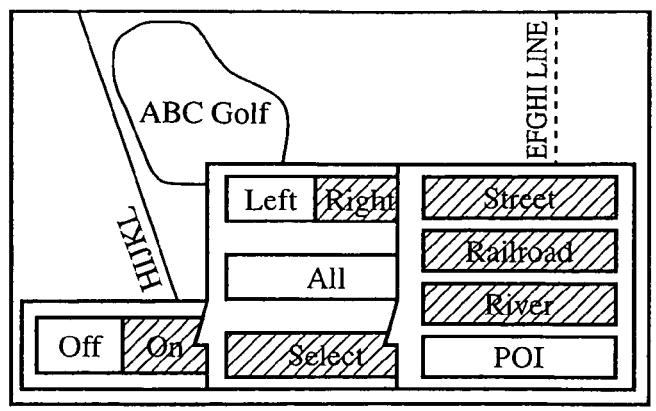

FIG.6
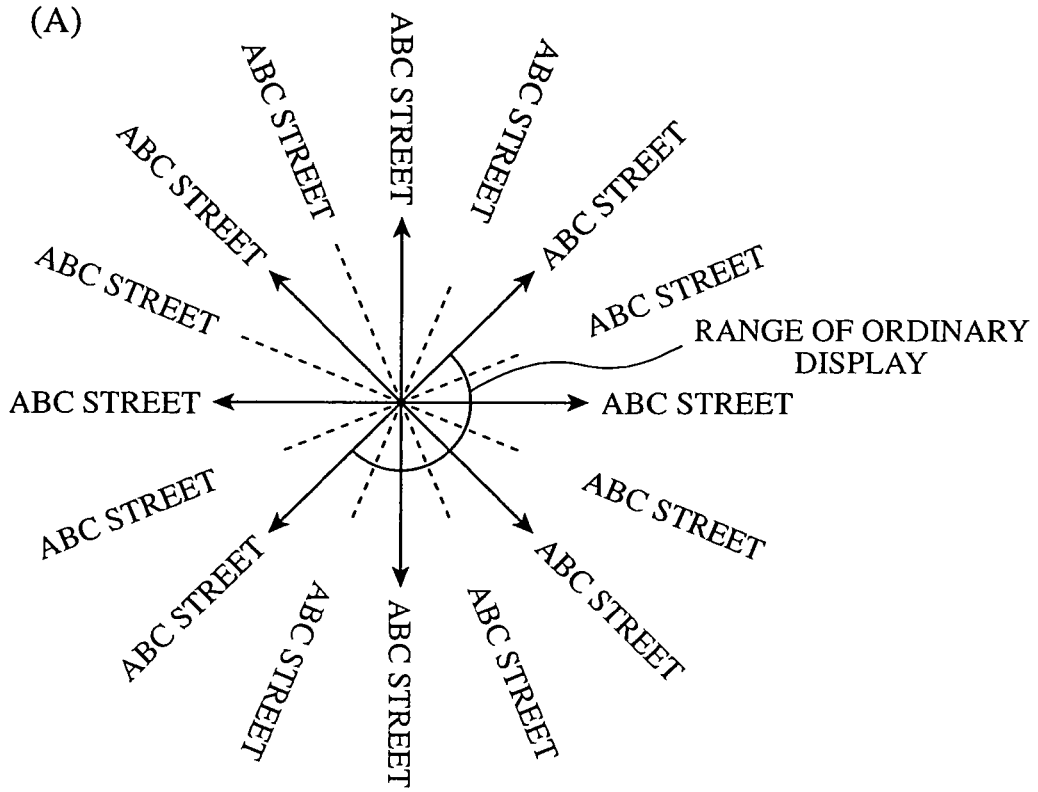
(A)
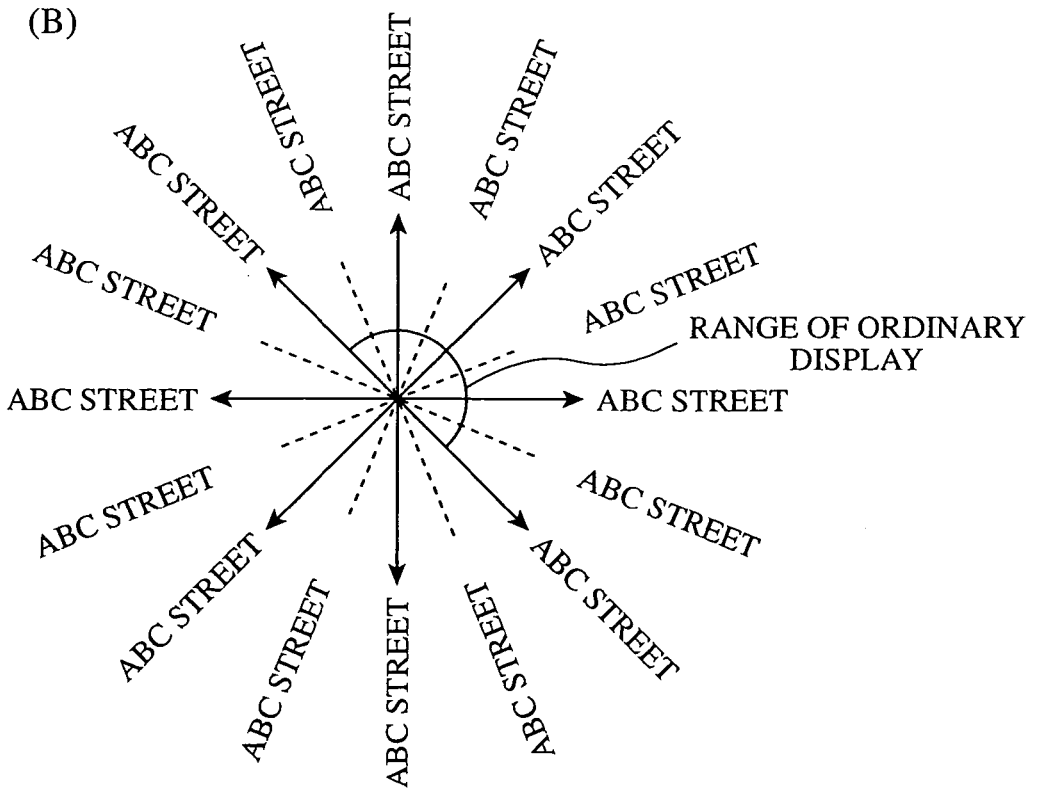
(B)

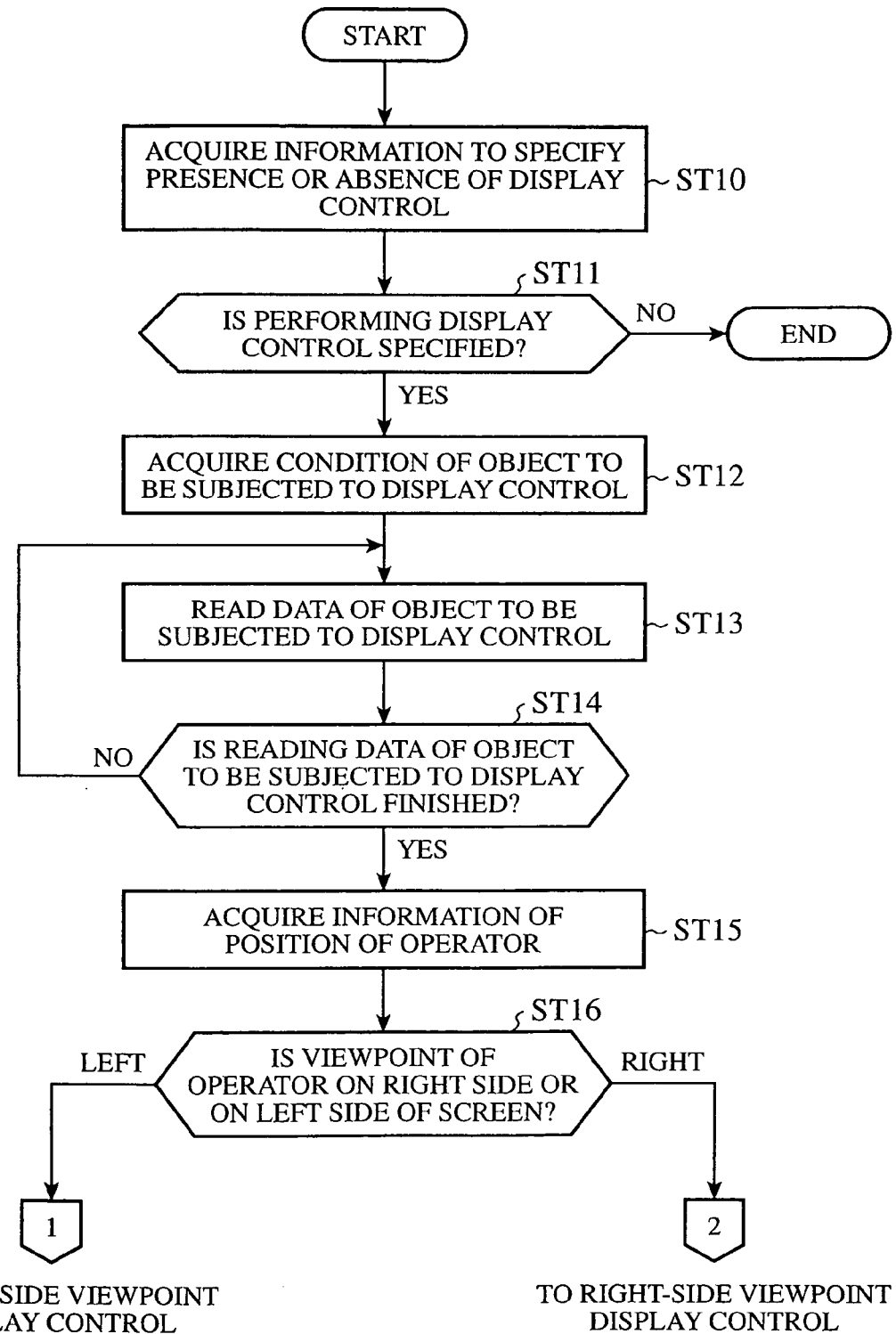

FIG.9
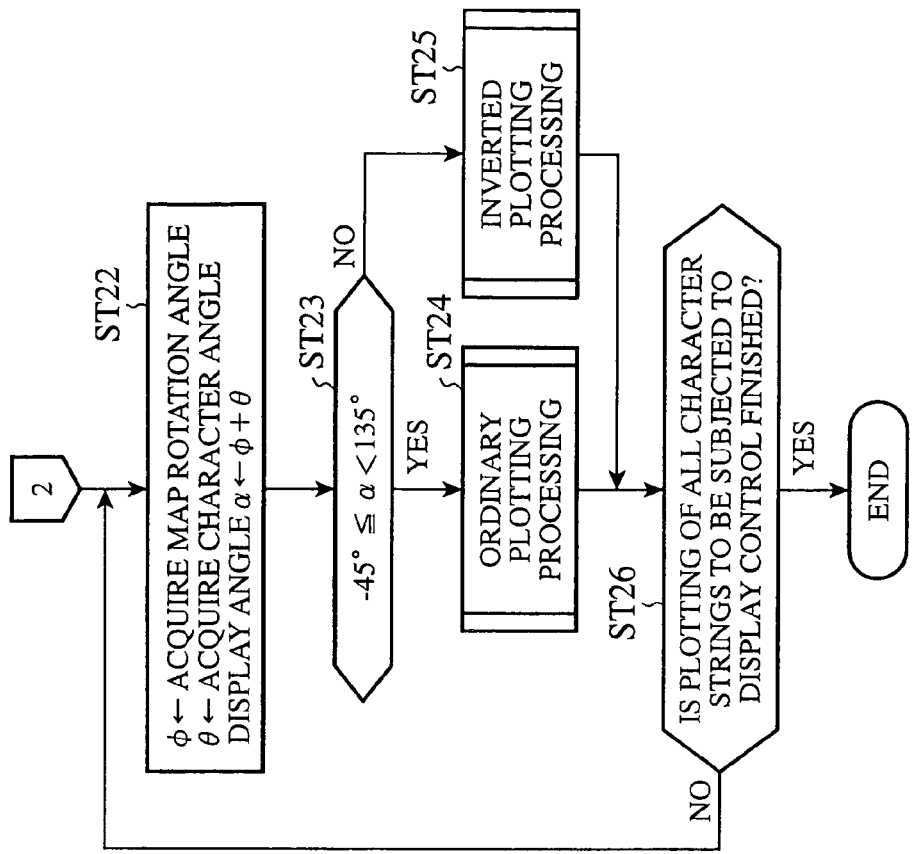
(B) RIGHT-SIDE VIEWPOINT DISPLAY CONTROL
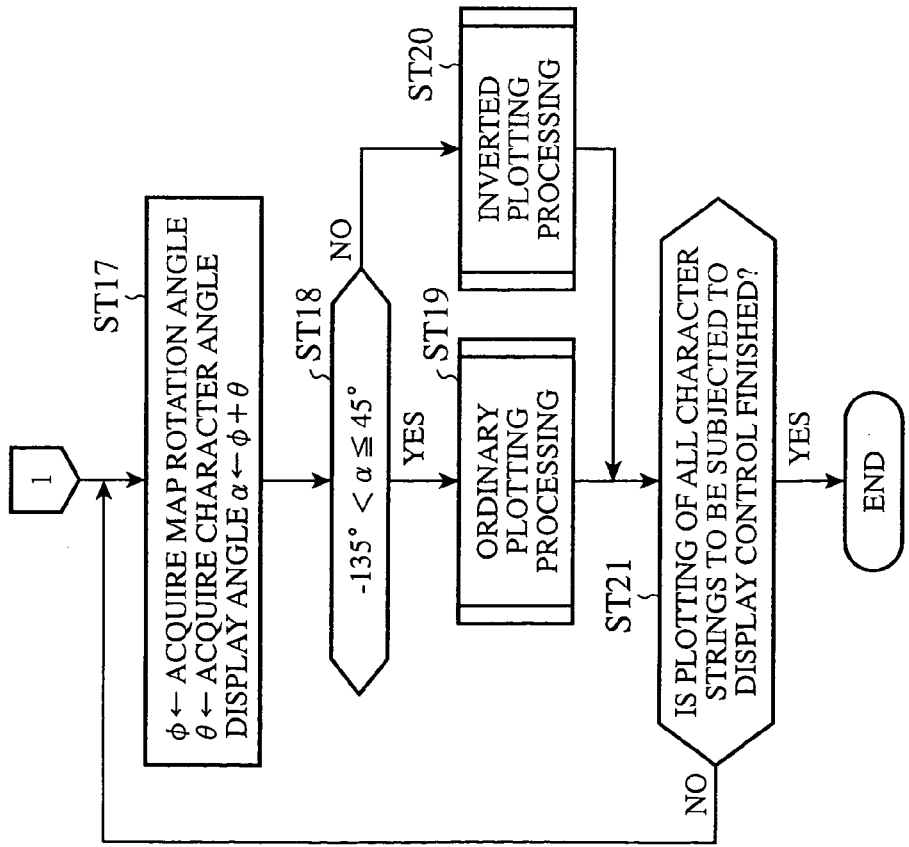
(A) LEFT-SIDE VIEWPOINT DISPLAY CONTROL

DISPLAY APPARATUS AND METHOD FOR ALTERING DISPLAY ELEMENTS BASED ON VIEWPOINT

BACKGROUND OF THE INVENTION

1. Field of the Invention

The present invention relates to a display apparatus and a display method used, for example, for a navigation system and, in particular, to a technology for controlling a direction of display of a character string displayed on its display screen.

2. Description of the Related Art

A car navigation system which is mounted on a vehicle has been hitherto known. By this car navigation system, a driver can drive a car while checking his car position by looking at a map displayed on the display screen of a display apparatus, so the driver does not lose his way but can arrive at his destination without fail and in a short time.

The conventional car navigation system like this has a north-up mode of a map display in which the north is always displayed upward and a heading-up mode of a map display in which the direction of travel is always displayed upward as a mode of displaying a map on the display screen. In the heading-up mode, when the direction of travel of the vehicle is changed, for example, at a crossroad or a curved road, the contents of display screen are rotated as a whole along with this change in the direction of travel of the vehicle. Hence, characters and symbols displayed on the map are also rotated.

In general, when roads on the displayed map are designated by names, character strings constructing the names are displayed along the roads (in order to be in parallel to the roads). Hence, when the character strings are rotated along with the rotation of the whole contents displayed on the display screen, there is bought about a state where the character strings are displayed in an inverted position when viewed from a driver depending on a rotation angle. Since the display apparatus is mounted at the center of vehicle, whether or not the character strings are displayed in an inverted position when viewed from the driver, differs according to the position of driver's seat, that is, whether the vehicle is a left-hand drive vehicle or a right-hand drive vehicle.

In this regard, as a related art have been known a menu screen display method by which the switch operating part of a menu screen displayed on a monitor is displayed at a position closer to a passenger's seat side when the part is operated from the passenger's seat side and is displayed at a position closer to a driver's seat side when the part is operated from the driver's seat side, and a display apparatus using the method (see, for example, patent document 1).

Moreover, a navigation apparatus has been known which is provided with a display control unit for controlling a screen display in such a way that a driver can easily look at and operate the screen of a display unit from the driver's seat, at which a steering wheel is mounted, on the basis of the positional relationship between a position where the steering wheel is mounted and the display unit, thereby improving visibility and operability relating to the display unit from the driver's seat and further improving visibility and operability relating to the display unit also in response to an operation from the passenger's seat (see, for example, patent document 1).

[Patent document 1] Japanese Unexamined Patent Publication No. 2001-222271
[Patent document 2] Japanese Unexamined Patent Publication No. 2003-121160

As described above, the display apparatus of a car navigation system in the related art presents a problem of bringing about a state where while the display apparatus is being operated in the heading-up mode, the character strings displayed on the map are rotated and displayed in the inverted position along with the rotation of map displayed on the display screen, thereby making the characters hard to read.

SUMMARY OF THE INVENTION

The present invention has been made to solve the above described problems. It is an object of the present invention to provide a display apparatus capable of displaying characters on a screen in a state where a person looking at the screen can always look at the screen with ease and a display method thereof.

In order to achieve the above object, a display apparatus in accordance with the present invention includes: a display section for displaying a character; and a control section that receives a setting from which side the display section is viewed and rotates the character to display on the display section if an inclination of the character to be displayed on the display section with respect to a horizontal line is out of a predetermined range of angle that is decided according to said set side.

According to the display apparatus in accordance with the present invention, a side from which a display section for displaying a character is viewed, is set and the character is rotated and displayed on the display section if the inclination of the character to be displayed on the display section with respect to a horizontal line is out of a predetermined range of angle. Therefore, it is possible to display the character on a screen in a state where the person looking at the screen can easily look at the character.

BRIEF DESCRIPTION OF THE DRAWINGS

FIGS. 3A-3B are diagrams to describe map data used in the car navigation system in accordance with embodiment 1 of the present invention.

FIGS. 4A-4C are diagrams to describe the outline of the present invention.

FIG. 5 is a diagram to describe a relationship between the rotation angle of map and the display angle of road link in the car navigation system in accordance with embodiment 1 of the present invention.

FIGS. 6A-6B are diagrams to show an example of a critical angle of inversion in the direction of display of a character string used in the car navigation system in accordance with embodiment 1 of the present invention.

FIGS. 7A-B are diagrams to show the construction of a touch panel used as an input device in the car navigation system in accordance with embodiment 1 of the present invention.

FIG. 8 is a flow chart to show a common processing in a display control processing in the car navigation system in accordance with embodiment 1 of the present invention.

FIGS. 9A-9B are flow charts to show a left-side viewpoint display control processing and a right-side viewpoint display control processing in the car navigation system in accordance with embodiment 1 of the present invention.

DETAILED DESCRIPTION OF THE PREFERRED EMBODIMENT

Hereafter, the preferred embodiment will be described in detail with reference to the drawings.

Embodiment 1

Figure 1:
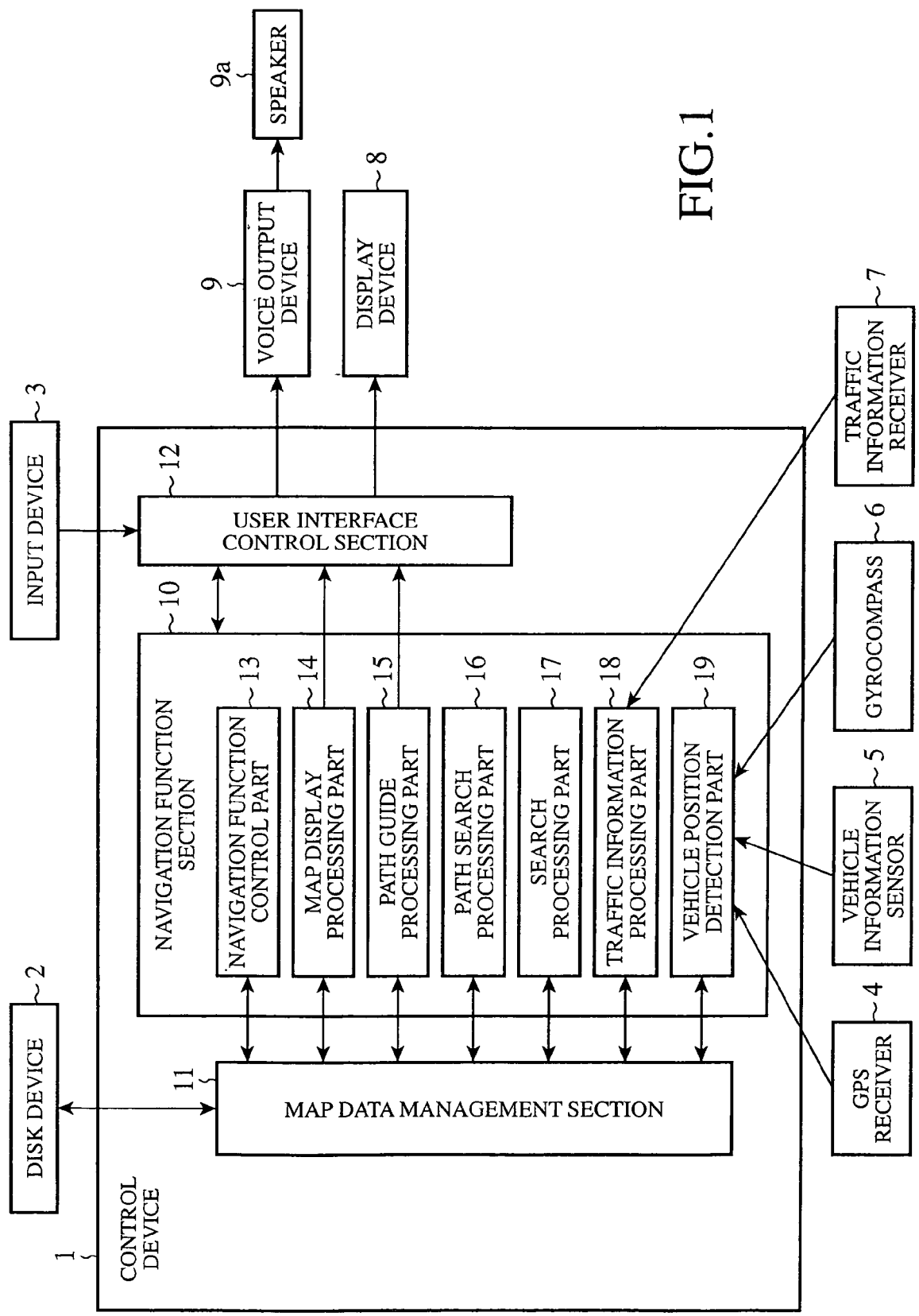
FIG. 1 is a block diagram to show the construction of a car navigation system in accordance with embodiment 1 of the present invention.

FIG. 1 is a block diagram to show the construction of a car navigation system in accordance with embodiment 1 of the present invention. This car navigation system is constructed of a control device 1, a disk device 2, an input device 3, a GPS receiver 4, a vehicle information sensor 5, a gyrocompass 6, a traffic information receiver 7, a display device 8, a voice output device 9, and a speaker 9a.

The control device 1 is constructed, for example, of a microprocessor. This control device 1 is constructed of a navigation function section 10, a map data management section 11, and a user interface control section 12. The navigation function section 10, further, is constructed of a navigation function control part 13, a map display processing part 14, a path guide processing part 15, a path search processing part 16, a search processing part 17, a traffic information processing part 18, and a vehicle position detection part 19.

In the disk device 2, recording media on which map data, music data, image data, control program data, and the like are recorded, are inserted and their recorded contents are reproduced. CD (Compact Disk), DVD (Digital Versatile Disk), and the like are used as the recording media. The map data, music data, image data, control program data, and the like which are produced by this disk device 2 are sent to the control device 1.

At this point, the map data recorded on the recording medium will be described. FIG. 3 shows road line information (hereinafter referred to as "road link") defined as one constituent element of the map data, and the name of road and information accompanying the road name (hereinafter referred to as "road name data"). These road link and road name data are made on an assumption that the map is displayed in a manner which the north direction is always pointing right upward (north-up mode).

The road link is defined by starting position coordinates (hereinafter referred to as "road link starting point") and a link angle θ. The link angle θ is an angle formed by the X axis (horizontal line) and the road link. The road name data is defined by a character string which designates a name of the road, a starting position of writing a character string, a character angle, and an attribute. The starting position of writing a character string is defined by offset coordinates (X, Y) from the starting point of road link. The character angle is defined such that the character string is parallel to the road link. In other words, the character angle has the same content as the link angle θ (that is, character angle=link angle). The attribute includes the kind of link such as street, railroad, and parameters required for plotting (offset value of stating position of writing, which will be described in detail later).

FIG. 3(A) shows a road link extending in an east-west direction, that is, a road link having a link angle of 0 degree. FIG. 3(B) shows a road link inclined by a link angle of θ with respect to the east-west direction. In the map data, railroads and rivers are also defined by the same manner as above described method for the road.

The input device 3 (setting member) is constructed of switches (not shown) mounted on an operation panel of the car navigation system and a touch panel (not shown) formed on a screen of the display device 8. This input device 3 is used by users to in put various requests. The data input from this input device 3 is sent to the user interface control section 12 of control device 1.

The GPS receiver 4 receives a signal from a GPS satellite to detect the present position of a vehicle. Data showing the present position of vehicle which is detected by this GPS receiver 4 is sent to the vehicle position detection part 19 in navigation function section 10 of the control device 1.

The vehicle information sensor 5 (setting member) detects a side from which the display section is viewed. This vehicle information sensor 5 can be constructed of, for example, a seating sensor for detecting that a person sits down on a seat, a camera system for detecting the position of a person from an image taking inside of the vehicle, and the like. Data showing the side from which the display section is viewed that is detected by this vehicle information sensor 5 is sent to the vehicle position detection part 19 in navigation function section 10 of the control device 1.

The gyrocompass 6 detects the direction of travel of the vehicle. Data showing the direction of travel of the vehicle which is detected by this gyrocompass 6 is sent to the vehicle position detection part 19 in navigation function section 10 of the control device 1.

The traffic information receiver 7 receives, for example, a traffic information signal issued by the tele-terminal of a vehicle information and communication system (VICS). Data showing traffic information which is received by this traffic information receiver 7 is sent to the traffic information processing part 18 in navigation function section 10 of the control device 1.

The display device 8 is constructed of, for example, an LCD and displays a map, a vehicle position mark, and other messages according to the display signal sent from the control device 1.

The voice output device 9 produces a voice signal according to voice data which is sent from the control device 1 and sends the voice signal to the speaker 9a. The speaker 9a converts the voice signal from the voice output device 9 into sound and outputs the sound. With this, various guide messages by voice are issued from the speaker 9a.

Next, the control device 1 will be described in detail. The control device 1, as described above, is constructed of the navigation function section 10, the map data management section 11, and the user interface control section 12.

The map data management section 11 reads map data from the disk device 2. Moreover, the map data management section 11 reads the map data from the disk device 2 in response to a request from the navigation function section 10 and subjects the map data to some processing if necessary and sends the map data to the navigation function section 10.

The user interface control section 12 receives a user request input from the input device 3 and generates a control command responsive to the content of the request and sends the control command to the navigation function section 10. To be concrete, the control command is sent at the same time to any one or not less than two of the parts constructing the navigation function section 10, that is, the navigation function control part 13, the map display processing part 14, the path guide processing part 15, the path search processing part 16, the search processing part 17, the traffic information processing part 18, and the vehicle position detection part 19. Further, the user interface control section 12 integrates processing results which are returned from the navigation function section 10 in response to the control command and sends the integrated processing results to the display device 8 and/or the voice output device 9. With this, information requested by the user is displayed on the display device 8 and a message by voice is output from the speaker 9a.

Next, the navigation function section 10 will be described in detail. The navigation function section 10, as described above, is constructed of the navigation function control part 13, the map display processing part 14, the path guide processing part 15, the path search processing part 16, the search processing part 17, the traffic information processing part 18, and vehicle position detection part 19.

The navigation function control part 13 controls the whole of navigation function section 10. This navigation function control part 13 is provided with a memory, though it is not shown, for storing "information associated with the system" which is related to the vehicle itself. In this memory for storing information associated with the system are stored, for example, a type of the vehicle, a steering wheel installation position (left-hand drive or right-hand drive), display control conditions (which will be described below in detail), and place of delivery of the system.

The map display processing part 14 produces display data for map display on the basis of map data which is read from the map data management section 11 and sends the display data to the user interface control section 12. This map display processing part 14 will be below described in detail.

The path guide processing part 15 acquires map data from the map data management section 11 and subjects the acquired map data to a processing for path display (for example, a processing for displaying a path to be guided). Then, the map data subjected to the processing for path display is returned to the map data management section 11. The path search processing part 16 acquires map data from the map data management section 11 and subjects the acquired map data to a path search processing and returns the results of path search to the map data management section 11.

The search processing part 17 acquires map data from the map data management section 11 and searches the acquired map data for a destination input from the input device 3 and returns the result of search to the map data management section 11. The traffic information processing part 18 acquires map data from the map data management section 11 and performs, for example, a processing for displaying a traffic jam position on the acquired map data on the basis of traffic information received by the traffic information receiver 7 and returns the result of processing to the map data management section 11.

The vehicle position detection part 19 sends data showing the present position which is acquired from the GPS receiver 4, data showing a side from which the display section is viewed that is acquired from the vehicle information sensor 5, and data showing a direction of travel which is acquired from the gyrocompass 6 to the map data management section 11.

Figure 2:
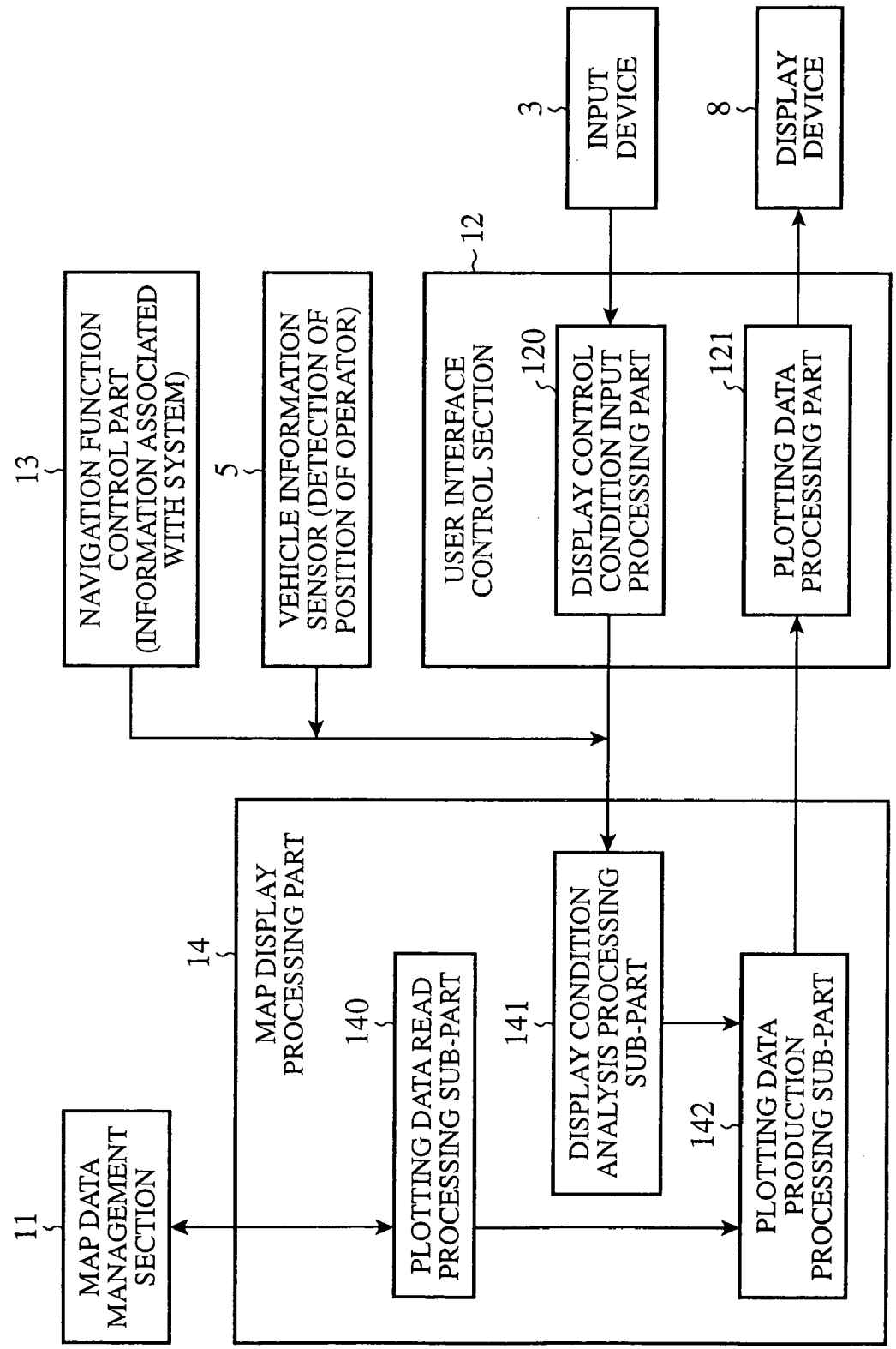
FIG. 2 is a functional block diagram to show the functional construction of the car navigation system in accordance with embodiment 1 of the present invention.

FIG. 2 is a functional block diagram to functionally show a car navigation system in accordance with the present invention. Devices, sections, and parts corresponding to constituent elements shown in FIG. 1 in this block diagram are denoted by the same reference numerals as used in FIG. 1.

This car navigation system is constructed of the map data management section 11, the user interface control section 12, the car navigation function control part 13, the map display processing part 14, the input device 3, the vehicle information sensor 5, and the display device 8. The functions of these constituent elements have been described above and the constructions of the user interface control section 12 and the map display processing part 14 will be described in more detail.

The user interface control section 12 is constructed of a display control condition input processing part 120 and a plotting data processing part 121. The display control condition input processing part 120 extracts display control conditions from data input from the input device 3 and sends the display control conditions to the map display processing part 14. The display control conditions include the presence or absence of display control, an object to be subjected to display control, and the position of an operator, that is the side from which the display section is viewed.

The plotting data processing part 121 produces a display signal on the basis of plotting data sent from the map display processing part 14 and transmits the display signal to the display device 8. With this, a map, a vehicle position mark, and other messages are displayed on the display device 8.

The map display processing part 14 is constructed of a plotting data read processing sub-part 140, a display condition analysis processing sub-part 141, and a plotting data production processing sub-part 142. The plotting data read processing sub-part 140 reads plotting data corresponding to a map displayed on the display device 8 from the map data management section 11 and sends the plotting data to the plotting data production processing sub-part 142.

The display condition analysis processing sub-part 141 produces display control conditions on the basis of display control condition information sent from the display control condition input processing sub-part 120 of the user interface control section 12, operator position information sent from the vehicle information sensor 5 via the vehicle position detection part 19 and the map data management section 11 (see FIG. 1), and a steering wheel installation position and display control condition information which are included in information associated with the system sent from the memory for storing the information associated with the system of the navigation function control part 13, and sends display control conditions to the plotting data production processing sub-part 142.

The plotting data production processing sub-part 142 processes plotting data acquired from the plotting data read processing sub-part 140 according to the display control conditions acquired from the display condition analysis processing sub-part 141 to produce plotting data used for actual display and sends the plotting data to the plotting data processing sub-part 121. A processing in this plotting data production processing sub-part 142 will be later described in detail with reference to a flow chart.

Next, the outline of the present invention will be described before the operation of car navigation system constructed in the manner described above will be described.

FIG. 4 is a diagram to describe the outline of the present invention. FIG. 4(A) shows a map displayed on a display device of an ordinary car navigation system. This map is constructed of a link extending in the lateral direction on the screen and a name "EFG ST" given to the link, a link extending in the vertical direction on the upper side of the screen and a name "ABC AVE" given to the link, and a link extending in the vertical direction on the lower side of the screen and a name "HIJKL" given to the link. When the operator looks at this map, if the viewpoint of operator is on the left side of the screen, the name of link "ABC AVE" looks inverted, whereas if the viewpoint of operator is on the right side of the screen, the name of link "HIJKL" looks inverted. Therefore, the map displayed on the screen becomes hard to look.

The present invention is made to display a character string constructing the name in a rotated position according to the side from which the screen is viewed (viewpoint of an operator) so as to avoid the map from becoming hard to look as described above. For example, as shown in FIG. 4(B), when the viewpoint of operator is on the left side of the screen, the name "ABC AVE", which looks inverted if no operation is performed, is rotated by 180 degrees and is displayed at a display position moved to the upper side of the link. On the other hand, as shown in FIG. 4(C), when the viewpoint of operator is on the right side of the screen, the name "HIJKL", which looks inverted if no operation is performed, is rotated by 180 degrees and is displayed at a display position moved to the upper side of the link. With this operation, when the operator looks at the map, the name of link is not displayed in an inverted position and the name of link is always displayed on the upper side of the link, thereby an easily visible map can be supplied to the operator.

When the car navigation system is operated in a heading-up mode, the whole of map displayed on the display screen of display device 8 is rotated such that a direction of travel of the vehicle always points upward. FIG. 5 is a diagram to show a relationship between the rotation angle φ of map and a display angle α of the road link. In a road link defined in such a way as to have an inclination of an angle θ with respect to a horizontal line on the map data, as shown in FIG. 3(B), when the map is rotated by a rotation angle φ, the display angle α of road link displayed on the screen becomes "φ+θ".

The display angle α calculated in this manner is compared with a critical angle of inversion in the direction of display of a character string to determine the direction of display of the character string. FIG. 6(A) is a diagram to show an example of a critical angle of inversion in the direction of display of a character string when the viewpoint of operator is on the left side of the screen. In this case, if the display angle α of a character string is −135 degree<α≦45 degree, an ordinary display is performed in which a character string is displayed outward from a center and if the display angle α of a character string is 45 degree<α≦225 degree, an inverted display is performed in which a character string is displayed toward a center from the outside.

Similarly, FIG. 6(B) is a diagram to show an example of a critical angle of inversion in the direction of display of a character string when the viewpoint of operator is on the right side of the screen. In this case, if the display angle α of a character string is −45 degree≦α<135 degree, an ordinary display is performed in which a character string is displayed toward the outside from a center and if the display angle α of a character string is 135 degree≦α<315 degree, an inverted display is performed in which a character string is displayed toward a center from the outside.

Hereafter, an operation of car navigation system in accordance with embodiment 1 of the present invention will be described in detail. In the following description, it is assumed that a control of a character string displayed on the display device 8 is performed according to display control conditions input from the input device 3. In this example, it is assumed that the input device 3 is constructed of a touch panel and a user sets display control conditions such as the presence or absence of display control, objects to be subjected to display control, and the side from which the display section is viewed by the use of this touch panel.

FIG. 7 is a diagram to show the construction of a touch panel formed on the screen of display device 8. An operation menu including "ON" and "OFF" is used for specifying the presence or absence of display control. When "ON" is specified in this operation menu, a sub-menu to set further detailed conditions is displayed.

Items of "Left" and "Right" of the sub-menu are used when the user sets the side from which the display section is viewed by use of the input device 3. Hence, when the side from which the display section is viewed is detected on the basis of a steering wheel installation position stored in the memory for storing information associated with the system or information acquired from the vehicle information sensor 5, the display of these items of "Left" and "Right" is omitted. Here, even when the side from which the display section is viewed is detected on the basis of the steering wheel installation position or the information acquired from the vehicle information sensor 5, it is also possible to employ a construction in which when the item of "Left" or "Right" is specified from the input device 3, the specified item is adopted on a priority basis.

Moreover, a sub-menu "All" specifies that all kinds of character strings are objects to be subjected to display control, "Select" specifies that the kind of object to be subjected to display control is selected by the user. When "Select" is specified, as shown in FIG. 7(B), a menu for selecting an object to be subjected to display control is displayed. In this menu, "Street" to show a road line, "Railroad" to show a railroad, "River" to show a river, "POI" to show the name of a place or a facility can be selected.

FIG. 7(A) is an example of setting when the viewpoint of operator is on the left side of the screen and shows a case where there is provided an instruction ("ON") to the effect that display control needs to be performed and where all kinds of character strings displayed on the map are subjected to display control. Therefore, the names of "EFG LINE" and "HIJKL" given to links and "ABC Golf" to show the name of a facility are displayed in such a way that they are not inverted when viewed from the left side of the screen. In other words, set conditions in FIG. 7(A) are as follows: display control=ON; viewpoint=left side; and objects to be controlled: all kinds of objects.

FIG. 7(B) is an example of setting when the viewpoint of operator is on the right side of the screen and shows a case where there is provided an instruction ("ON") to the effect that display control needs to be performed and where among the kinds of character strings displayed on the map, the names of road, railroad, and river are subjected to display control but the name of facility (POI) is out of display control. In other words, set conditions in FIG. 7(B) are as follows: display control=ON; viewpoint=right side; and objects to be controlled: road ("Street"), railroad ("Railroad"), river ("River"); object out of display control=name of facility ("POI").

Figure 10:
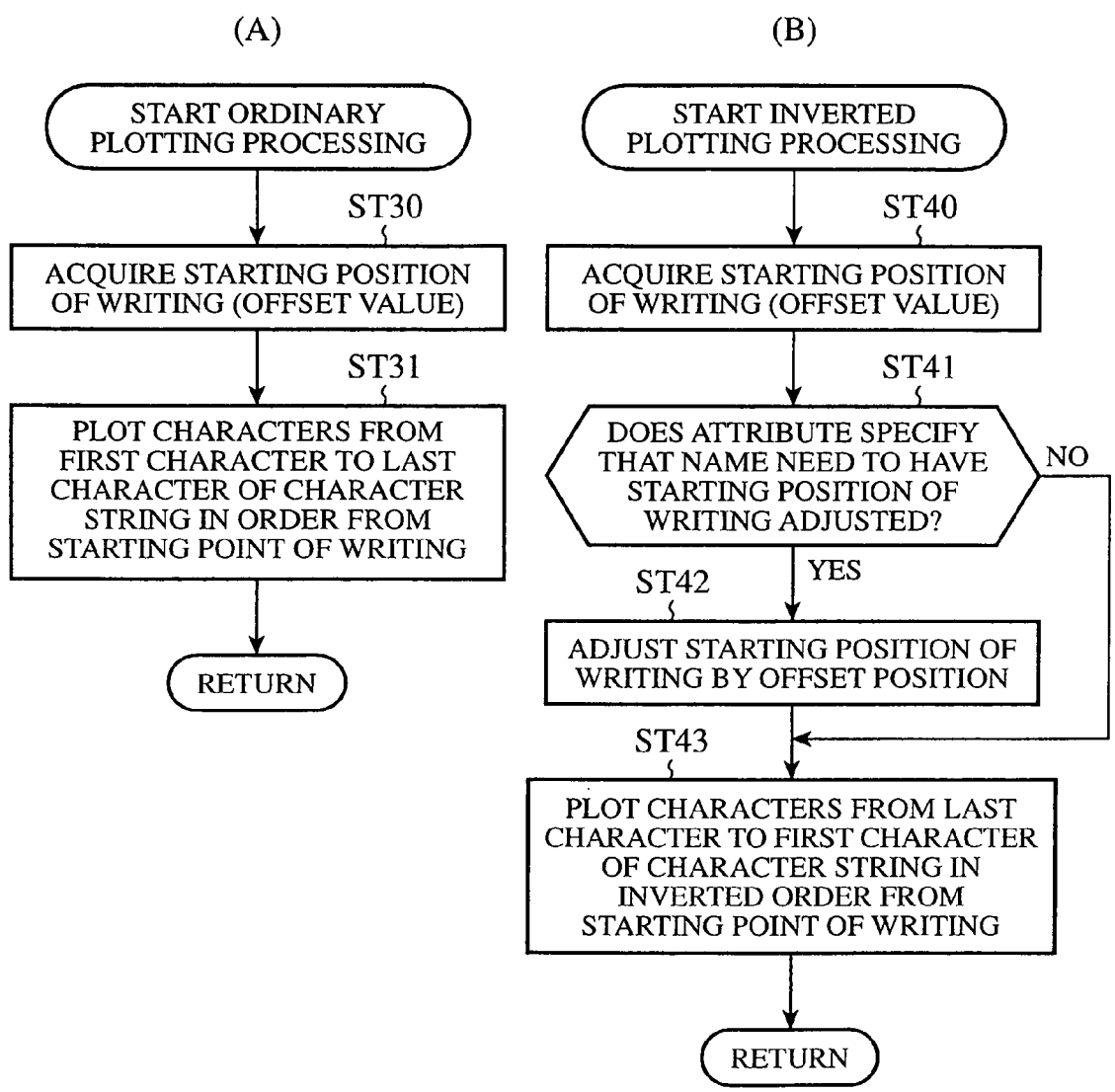
FIGS. 10A-10B are flow charts to show an ordinary plotting processing and an inverted plotting processing shown in FIG. 9.

Next, a display control processing performed by the map display processing part 14 will be described with reference to flow charts shown in FIG. 8 to FIG. 10.

In this display control processing, first, information to specify the presence or absence of display control is acquired (step ST10). To be concrete, in the case of information for specifying the presence or absence ("ON" or "OFF") of display control and information for specifying an object to be subjected to display control ("All" or "Select" and in the case of "Select", further, "Street", "Railroad", "River", and "POI"), all of which are input from the input device 3, are acquired. At this point, in a case where the information to be input from the above-described input device 3 and to specify the presence or absence of display control is previously stored in the memory for storing information associated with the system, it is possible to adopt a construction in which the information for specifying the presence or absence of display control is acquired from this memory for storing information associated with the system. According to this construction, although the presence or absence of display control and the objects to be subjected to display control are fixed, the user can be saved from spending time and effort for setting the display control conditions by use of the input device 3.

Next, it is checked whether or not specification of performing display control is done (step ST11). Here, if it is determined that specification to the effect that display control needs to be performed is not done, this display control processing is finished.

If it is determined at step ST11 that specification to the effect that display control needs to be performed is done, next, the condition of an object to be subjected to display control is acquired (step ST12). The condition of an object to be subjected to display control is information to show which kind of "Street", "Railroad", "River", and "POI" the object to be controlled is.

Figure 11:
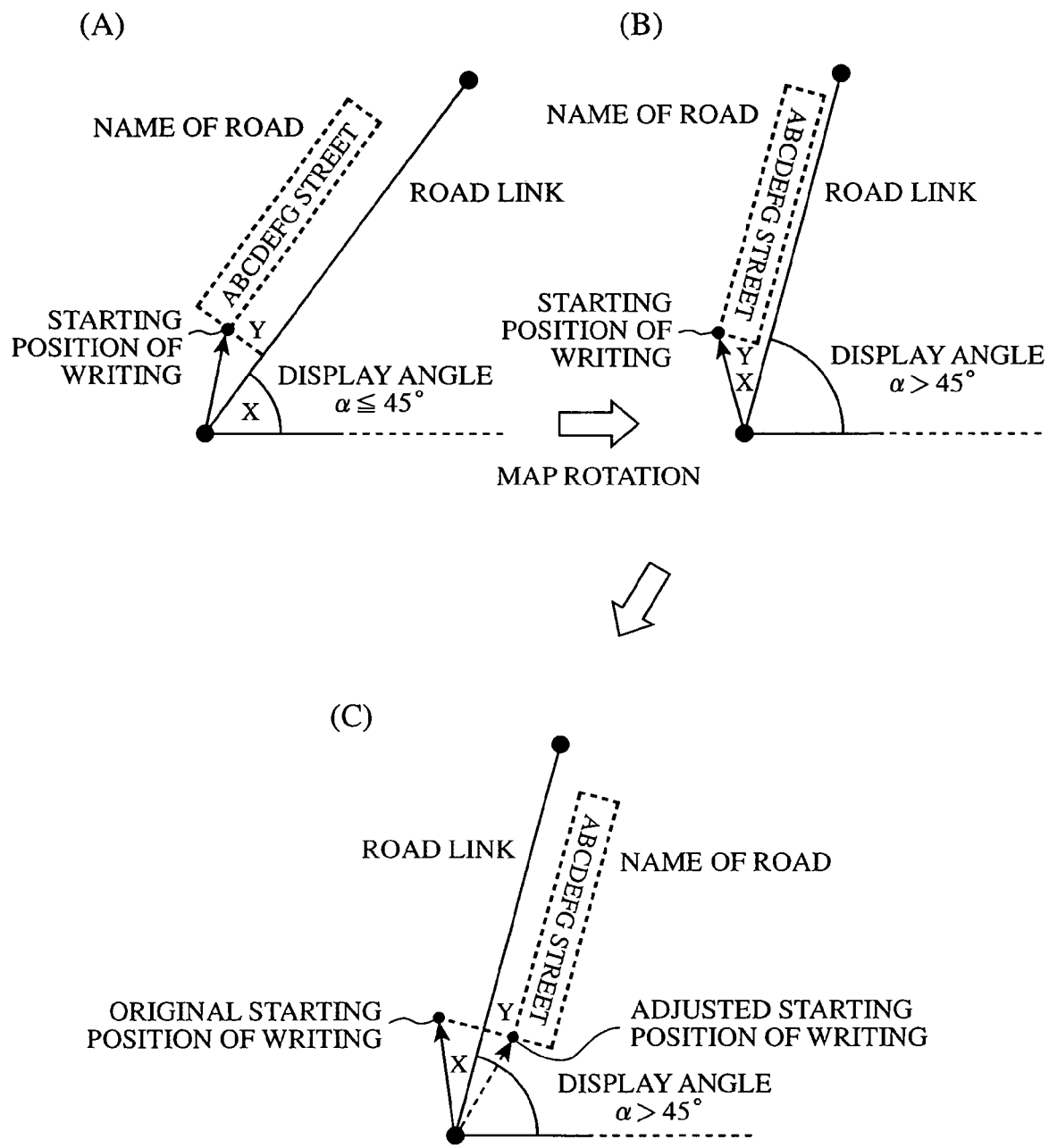
FIGS. 11A-11C are diagrams to describe the adjustment of starting position of writing by an offset value, which is performed at the time of performing an inverted display, in the car navigation system in accordance with embodiment 1 of the present invention.

Next, the plotting data of the object to be subjected to display control is read (step ST13). To be concrete, all of the name data of kinds specified as the objects to be subjected to display control (character string to show name, character angle, starting position of writing, and attribute) and plotting information (road link, railroad link, facility polygon information, and the like) are read. The "attribute" described here means whether or not the starting position of writing when the map is plotted in an inverted position needs to be adjusted. For example, in an inverted plotting processing, in the case of a name given to a line such as road line and railroad line, the starting position of writing needs to be adjusted (see FIG. 11) and in the case of the name of a facility displayed inside a facility polygon, the starting position of writing does not need to be adjusted.

Next, it is checked whether or not reading the data of objects to be subjected to display control is finished (step ST14). If it is determined that reading the data of objects to be subjected to display control is not finished, the sequence is returned to step ST13 where the data of objects to be subjected to display control is read again. If it is determined at step ST14 in the repeated processes of performing these steps ST13 and ST14 that reading the data of objects to be subjected to display control is finished, next, the information of data showing the side is acquired (step ST15). To be concrete, the side from which the display section is viewed ("Left" or "Right") that is input from the input device 3, is acquired.

Then, it is checked whether the side from which the display section is viewed, that is, the viewpoint of operator is on the left side or on the right side of the screen (step ST16). At this point, if it is determined that the viewpoint of operator is on the left of the screen, a left-side viewpoint display control processing shown by a flow chart in FIG. 9(A) is performed (steps ST17 to ST21). In this left-side viewpoint display control processing, first, a map rotation angle $\phi$ and a character angle $\theta$ are acquired and a display angle a is calculated (step ST17). Next, it is checked whether or not the display angle $\alpha$ satisfies a condition of −135 degree<$\alpha$≦45degree (step ST18). Then, if it is determined that the display angle $\alpha$ satisfies the condition, an ordinary plotting processing is performed (step ST19).

In this ordinary plotting processing, as shown in FIG. 10(A), first, the starting position of writing (offset value) is acquired (step ST30). Next, as shown in FIG. 11(A), the characters from the first character to the last character of the character string are plotted in order from the starting point of writing (step ST31). With this, an ordinary display when the operator is on the left side of the screen is performed. Then, the sequence is returned to step ST21 in FIG. 9(A).

If it is determined at step ST18 that the display angle $\alpha$ does not satisfy a condition of −135 degree<$\alpha$≦45 degree, the inverted plotting processing is performed (step ST20). In this inverted plotting processing, as shown in FIG. 10(B), first, the starting position of writing (offset value) and attribute are acquired (step ST40). Next, it is checked whether or not the attribute specifies that a name needs to have the starting position of writing adjusted (step ST41). Here, if it is determined that the attribute specifies that is the name needs to have the starting position of writing adjusted, the starting position of writing is adjusted by the offset value (step ST42). To be concrete, as shown in FIG. 11(B) and FIG. 11(C), the starting position of writing of a character string to be inverted by 180 degree is moved to a position symmetric with respect to the road link. If it is determined at the above step ST41 that the attribute does not specify that the name needs to have the starting position of writing adjusted, the processing at step ST42 is skipped.

Next, the respective characters are plotted in an inverted order from the last character to the first character of the character string from the starting point of writing (step ST43). With this, an inverted display when the operator is on the left side of the screen is performed. If the starting position of writing is not adjusted by use of the offset value, as shown in FIG. 11(B), the name is displayed on the lower side of road link, which is hard to look because the display lacks a feeling of consistency when the map includes the names of roads displayed in the ordinary position. However, if the starting position of writing is adjusted by use of the offset value, as shown in FIG. 11(C), the name is displayed on the upper side of road link, which becomes easy to look because the display gives a feeling of consistency even when the map includes the names of roads displayed in the ordinary position. Thereafter, the sequence is returned to step ST21 in FIG. 9(A).

It is checked at step ST21 whether or not plotting of all the character strings to be subjected to display control is finished, and if it is determined that the plotting is not finished, the sequence is returned to step ST17 where the same processing is repeated. Then, if it is determined at step ST21 that plotting of all the character strings to be subjected to display control is finished, the display control processing is finished.

If it is determined at step ST16 that the viewpoint of operator is on the right side, the right-side viewpoint display control processing shown in a flow chart in FIG. 9(B) is performed (steps ST22 to ST26). In this right-side viewpoint display control processing, first, a map rotation angle φ and a character angle θ are acquired and a display angle α is calculated (step ST22). Next, it is checked whether or not the display angle a satisfies a condition of −45 degree≦α<135 degree (step ST23). Then, if it is determined that the display angle a satisfies the condition, an ordinary plotting processing is performed (step ST24). The contents of this ordinary plotting processing are the same as the processing at step ST19 described above.

If it is determined at the above-described step ST23 that the display angle α does not satisfy the condition of −45 degree≦α<135 degree, an inverted plotting processing is performed (step ST25). The contents of this inverted plotting processing are the same as the processing at step ST20 described above. Thereafter, the sequence is returned to step ST26.

It is checked at step ST26 whether or not plotting of all the character strings to be subjected to display control is finished, and if it is determined that the plotting is not finished, the sequence is returned to step ST22 where the same processing is repeated. Then, if it is determined at step ST26 that plotting of all the character strings to be subjected to display control is finished, the display control processing is finished.

As described above, according to the car navigation system in accordance with embodiment 1 of the present invention, a side from which the display section of the display device 8 is viewed is set and when the operator looks at the display device 8 from this set side, the characters are displayed in a state where they are rotated by 180 degree if the inclination of characters to be displayed on the screen with respect to a horizontal line is out of a predetermined range of angle that is decided according to said set side. Therefore, the characters can be always displayed on the screen in a state where the operator can easily look at them.

Moreover, according to the car navigation system in accordance with embodiment 1 of the present invention, when characters are rotated (inverted) by 180 degree, the starting position of writing a character string is previously adjusted according to the attribute given to the characters to always display the name of link (road link, railroad link and the like) on the upper side of link. Therefore, the operator can easily look at the map.

What is claimed is:

1. A display method comprising:
    setting a side at which a display screen, for displaying a map and characters, is viewed from;
    acquiring a map rotation angle and a character string angle;
    calculating a display angle; and
    performing inverted plotting processing if the display angle of a character string with respect to a horizontal line is out of a predetermined range of an angle that is determined according to said set side,
    wherein said inverted plotting processing comprises:
        moving a starting position of writing of a character string to a position symmetric with respect to a road line; and
        plotting characters of said character string in an inverted order, from a last character to a first character, from said starting position of writing.

* * * * *